J. OLSAFSKIE.
CURRYCOMB.
APPLICATION FILED MAR. 13, 1908.
909,207.
Patented Jan. 12, 1909.
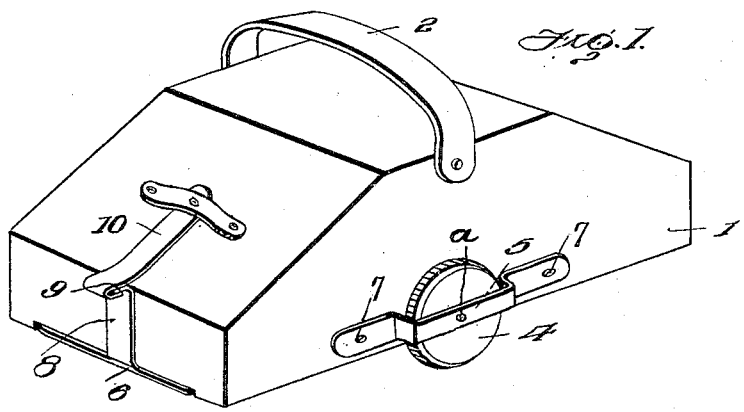
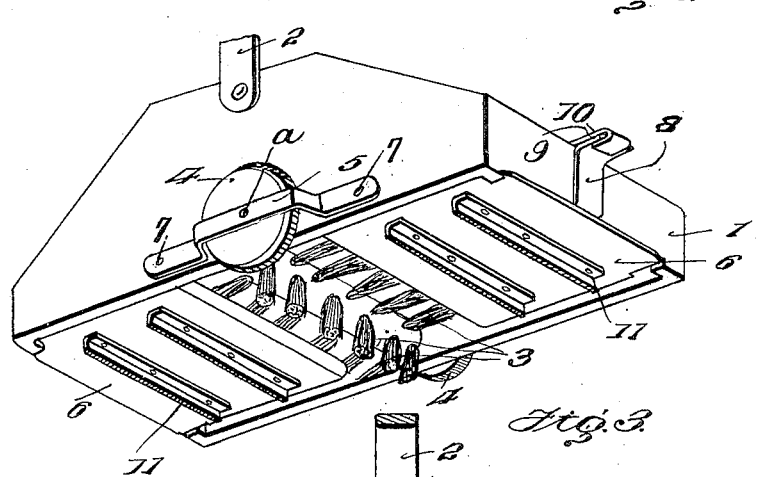
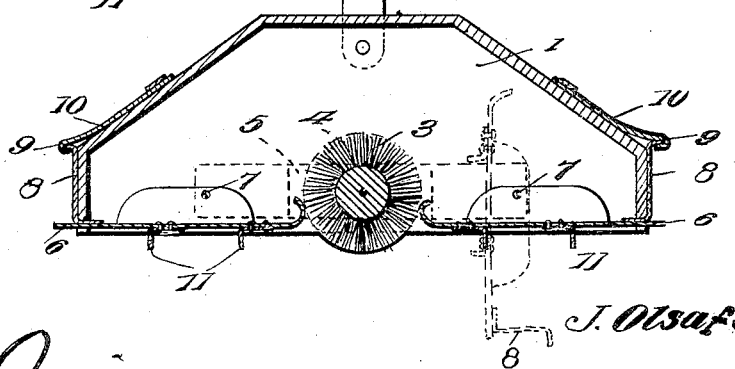
Witnesses
Inventor
J. Olsafskie.
By
Lacey, Attorneys

UNITED STATES PATENT OFFICE.

JOHN OLSAFSKIE, OF PANA, ILLINOIS.

CURRYCOMB.

No. 909,207.   Specification of Letters Patent.   Patented Jan. 12, 1909.

Application filed March 13, 1908. Serial No. 420,810.

*To all whom it may concern:*

Be it known that I, JOHN OLSAFSKIE, citizen of the United States, residing at Pana, in the county of Christian and State of Illinois, have invented certain new and useful Improvements in Currycombs, of which the following is a specification.

The present invention provides a device for grooming animals and for preventing loose hair, dirt and the like from flying about during the grooming operation.

The invention provides a combined brush and curry comb with means for catching and retaining the loose hair and dirt so as to prevent scattering of the same which is highly objectionable both to the animal and the attendant.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a curry comb embodying the invention. Fig. 2 is a perspective view of the curry comb. Fig. 3 is a vertical central longitudinal section, the dotted lines showing one of the combs turned as in the act of dumping the accumulations from the compartment closed thereby.

Corresponding and like parts are referred to in the following description and indicated in all the views of the drawings by the same reference characters.

The device comprises a box 1 which may be of any material and of a size to be conveniently handled, the end portions of the top of the box sloping for convenience of handling and to provide a neat and compact structure. The box 1 is closed at its top, ends and sides, the bottom being open and receiving the brush and combs. A strap 2 extends over the top of the box and is adapted to form a keeper through which the hand is inserted in the manner well understood. The rotary brush 3 is journaled at its ends in opposite sides of the box, the journals $a$ projecting beyond the sides of the box and receiving wheels 4, which are adapted to cause rotation of the brush by contact with the hide of the animal when the device is passed thereover. Keepers 5 are applied to opposite sides of the box and extend over the wheels 4 and prevent the hair catching therein. The rotary brush is centrally disposed and is adapted to be rotated by the action of the wheels 4 coming in contact with the hide of the animal in the operation of the device.

A curry comb is provided at each side of the rotary brush and closes the open side of the box and forms a receptacle for catching loose hair, dirt and the like removed from the hide of the animal when grooming the same. Each curry comb consists of a plate 6, whose opposite sides and the end adjacent to the rotary brush are bent upward to form a receptacle for catching and retaining the hair and dirt removed in the cleaning of the animal. Each curry comb is pivoted near its inner end to opposite sides of the box at 7, and its outer end is adapted to swing downwardly, as shown most clearly by the dotted lines in Fig. 3. In the normal position of the curry combs, their outer ends underlie the end pieces of the box 1. Finger pieces 8 project upward from the outer ends of the plate 6 and their upper ends extend outward to form projections 9 which are adapted to be engaged by catches 10 pivoted to end portions of the box 1 and having their outer ends of hook form and adapted to embrace the projections 9 and hold the curry comb in place.

In the operation of the device, the box is grasped in the hand, the latter being passed beneath the strap 2, the device being moved rapidly over the sides of the animal forward and backward in substantially the same manner as an ordinary curry comb.

In the operation of the device, the curry combs remove loose hair and dirt and the brush catches the same and by its action thrusts the greater part of the dirt and the like into the receptacles formed in the end portions of the box by the plates or curry combs. Toothed strips 11 are attached to the underside of the plate 6, thereby completing the curry combs.

Having thus described the invention, what is claimed as new is:

1. In combination, a box having its bottom open, a rotary brush mounted in the lower portion of the box, a plate having its inner end and opposite edge portions bent upwardly to form a receptacle and pivoted to the sides of the box and closing the opening of the bottom at one side of the brush, and currying teeth upon the lower side of said plate.

2. In combination, a box having its bottom open, a centrally disposed rotary brush mounted in the sides of the box, pivoted plates at opposite sides of the brush and closing the opening in the bottom thereof at each side of the brush, said plates having pivotal connection with the box and formed upon their upper sides to provide receptacles to catch loose hair, dirt and the like and having currying teeth upon their lower sides.

3. In combination, a box having an open bottom, a rotary brush, a curry comb pivoted to the box and having an end portion extended, a finger piece extended from the outer end of the curry comb, and a catch fitted to the box and coöperating with said finger piece to secure the curry comb in operative position.

In testimony whereof I affix my signature in presence of two witnesses.

JOHN OLSAFSKIE. [L. S.]

Witnesses:
　MARKS BUDDS,
　GEO. BUDDS.